(12) United States Patent
Sayers et al.

(10) Patent No.: US 8,266,542 B2
(45) Date of Patent: Sep. 11, 2012

(54) RENDERING AND SORTING BOOK SEARCH RESULTS AS THREE DIMENSIONAL ICONS

(75) Inventors: Craig Peter Sayers, Menlo Park, CA (US); Prakash Reddy, Fremont, CA (US); Prabodh Tiwari, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 100 days.

(21) Appl. No.: 12/817,724

(22) Filed: Jun. 17, 2010

(65) Prior Publication Data

US 2011/0314411 A1    Dec. 22, 2011

(51) Int. Cl.
*G06F 3/048* (2006.01)
*G06F 15/177* (2006.01)
*G06F 3/00* (2006.01)

(52) U.S. Cl. .................... 715/781; 715/836; 715/839
(58) Field of Classification Search .................. 715/781, 715/836, 839
See application file for complete search history.

(56) References Cited

U.S. PATENT DOCUMENTS

| 6,346,956 | B2 * | 2/2002 | Matsuda ....................... 715/848 |
| 6,917,922 | B1 | 7/2005 | Bezos et al. |
| 7,287,214 | B1 * | 10/2007 | Jenkins et al. ................ 715/205 |
| 7,430,561 | B2 | 9/2008 | Bailey et al. |
| 2002/0083101 | A1 * | 6/2002 | Card et al. .................... 707/526 |
| 2002/0143864 | A1 * | 10/2002 | Page et al. .................... 709/203 |
| 2008/0307343 | A1 * | 12/2008 | Robert et al. ................. 715/765 |
| 2011/0055203 | A1 * | 3/2011 | Gutt et al. .................... 707/722 |

FOREIGN PATENT DOCUMENTS

JP    2002092408    2/2009

OTHER PUBLICATIONS

Yi-Chun Chu, David Bainbridge, Matt Jones, and Ian H. Witten. 2004. Realistic books: a bizarre homage to an obsolete medium?. In Proceedings of the 4th ACM/IEEE-CS joint conference on Digital libraries (JCDL '04). ACM, New York, NY, USA, 78-86.*
Bill N. Schilit and Okan Kolak. 2008. Exploring a digital library through key ideas. In Proceedings of the 8th ACM/IEEE-CS joint conference on Digital libraries (JCDL '08). ACM, New York, NY, USA, 177-186.*
Delhi Book Store—Online http://www.delhibookstore.com, Sep. 10, 2010.
First and Second—Online http://www.firstandsecond.com, Sep. 10, 2010.
Google Books—Online http://books.google.com, Sep. 10, 2010.

* cited by examiner

*Primary Examiner* — William Bashore
*Assistant Examiner* — Andrea Long

(57) ABSTRACT

Illustrated is a system and method to prepare for display, within a Graphical User Interface (GUI), a subset selection pane, an icon and summary pane, and a sort pane. The system and method further to include to prepare for display, within the icon and summary pane, a result set that includes an icon representing a three dimensional book and a textual summary of the book. The system and method also includes enabling a screen object, within the subset selection pane, to receive input to select a subset of the result set to be displayed within the icon and summary pane. Further, the system and method includes enabling a screen object, within the sort pane, to receive input to select the subset of the result set to be sorted and displayed within the icon and summary pane.

20 Claims, 14 Drawing Sheets

FIG. 8

BOOKPREP SEARCH RESULTS

Search by book, author, title, or keyword  [SEARCH]

Found 114 matching books
403
Sorted by: Title Author Year 1804
1867
1873

The Temple of Nature (1804)
*Erasmus Darwin*
A description of nature as provided by Charles Darwin's father.

1876
1882

Memoirs of the life of Dr. Darwin (1804)
*Anna Seward*
Story of Darwin as told by his life long friend Anna Seward.

1886
1890
1893

The poetical works of Erasmus Darwin (1806)
*Erasmus Darwin*
Miscellaneous works of Charles Darwin's father.

405                                                    404

406 Search
Advanced Search

407 [Darwin]  [SEARCH]

802      803
Recent Searches

Search Term: "Darwin"
(114 Matching books)

...110...

801          804

US 8,266,542 B2

RENDERING AND SORTING BOOK SEARCH RESULTS AS THREE DIMENSIONAL ICONS

BACKGROUND

A web page or webpage is a document or resource of information that is suitable for the World Wide Web and can be accessed through a web browser and displayed on a monitor or mobile device. This information is usually in Hyper Text Markup Language (HTML) or eXtensible Markup Language (XML) format, and may provide navigation to other web pages via hypertext links. Web pages may be retrieved from a local computer or from a remote web server. The web server may publish pages on the World Wide Web. Web pages are requested and served from web servers using Hypertext Transfer Protocol (HTTP).

The content of web pages may be rendered in a web browser statically, dynamically, or as a combination of both static and dynamic. Technologies that are used to render content in a static manner include the aforementioned HTML and XML. Scripting languages such as Java Script, and Visual Basic Script (VB Script) may be used in the rendering of dynamic content. Technologies such as Asynchronous Java-Script and XML (AJAX) may be used in rendering portions of an otherwise static web page dynamically.

Web pages are used in the marketing of goods and services. One example way in which web pages are used in the marketing on goods and services is with respect to the sale of books. Web sites such as AMAZON.COM™, BOOKS.GOOGLE.COM™, BARNESANDNOBEL.COM™, and other retailers sell books using prior art web pages and one or more of the aforementioned technologies. For example, many of these sites display books for sale as a photographic image (e.g., a Joint Photographic Experts Group (JPEG) file, or a Tagged Image File Format (TIFF) file) of each book cover embedded into a web page. The web page may also include other information related to the book such as price information, author, or the number of pages of the book. These displayed books may be sorted lexigraphically, with all results displayed in a series of web pages.

BRIEF DESCRIPTION OF THE DRAWINGS

Some embodiments of the invention are described, by way of example, with respect to the following figures:

FIG. 8 is a diagram of a book search GUI, according to an example embodiment, used to realistically render and index book(s) in a webpage where icons are used to illustrate a search result history.

DETAILED DESCRIPTION

Illustrated is a system and method for the realistic rendering and indexing of a book(s) in a web page. The realistic render of a book includes the rendering of a book in a web page in a manner that shows the number of pages associated with the book. The realistic indexing of a book includes the displaying of search results for a book in a manner that reflects a physical index, rather than a sorted search results. Through the use of realistic rendering and indexing of a book, a book is rendered in a manner that approximates the experience of viewing a physical book or index for books.

In some example embodiments, an icon representing a book is displayed as part of the web page. The icon represents the cover of the book and an approximate thickness (i.e., depth) of the book based upon characteristics associated with the book. In contrast to the aforementioned web sites that use a two-dimensional photographic image to represent a book, the icon captures the 3D aspects of a book with the third dimension of depth based upon data relating to the physical characteristics of the book. This data includes: number of pages in the book, weight of paper associated with the book, type of paper associated with the book, color of the paper associated with the book, trim size of the book (i.e., the dimensions of the pages of the book), and a photographic image of the cover of the book. Accordingly, the more pages are associated with a book for sale on a web site that uses the system and method shown herein, the greater the depth of the icon representing the book.

In some example embodiments, book search results are sorted, indexed, and displayed through re-indexing a sub-set of the search results using a predefined sort value. A database containing book summary data may be searched using a string(s). The result set of the search may be sorted lexigraphically. This lexigraphically sorted result set may be filtered through a re-sorting of a subset, the subset resorted and indexed according to a predefined sort value. For example, if the database is searched using the string "Sartre," a result set is generated of all books that include the word "Sartre." This result set may be filtered by only selecting books where "Sartre" is the author so as to generate a sub-set of the result set, the subset including only books that have Sartre as the author. This subset can be sorted lexigraphically.

Figure 1:
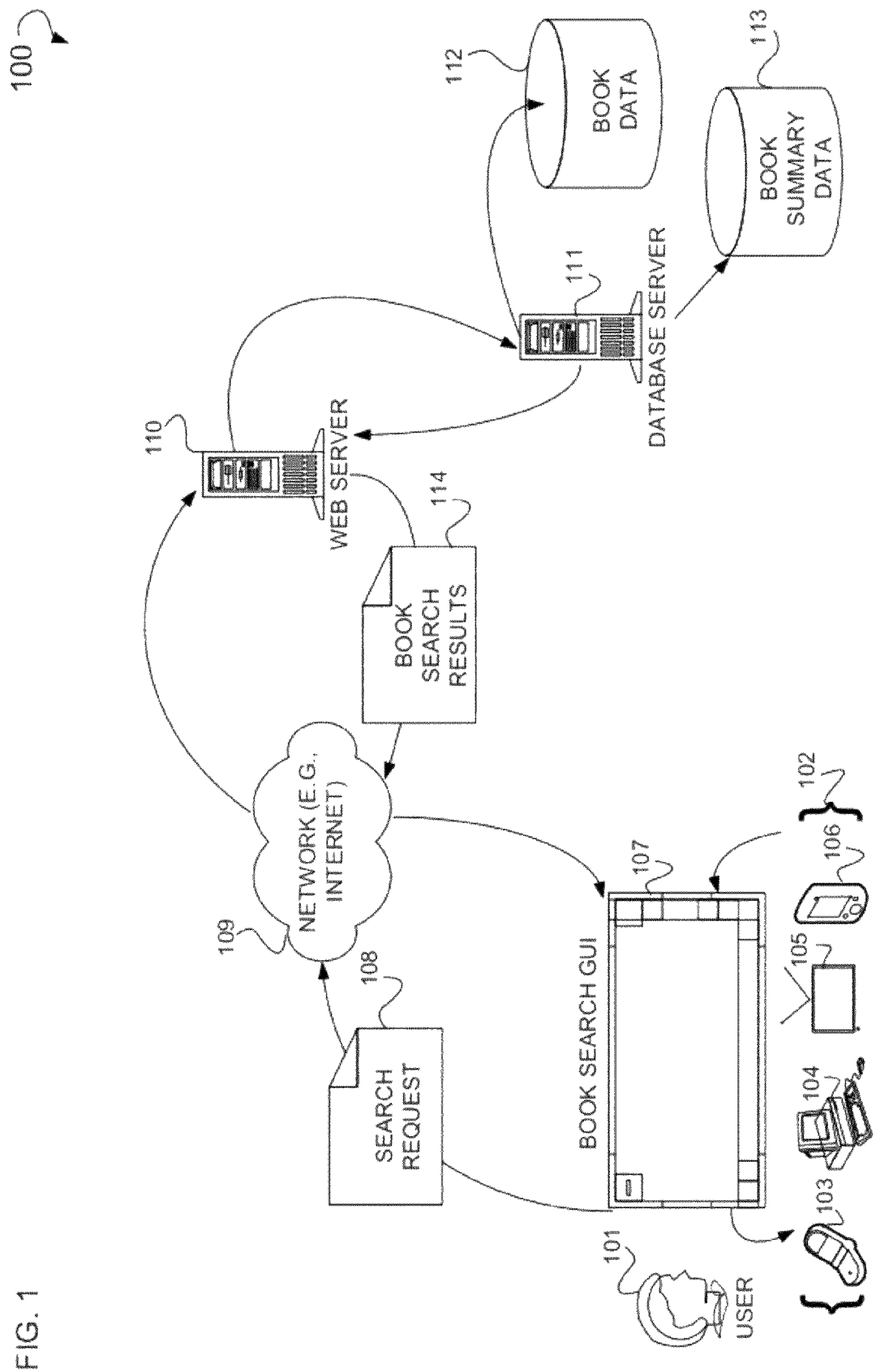
FIG. 1 is a system, according to an example embodiment, for the realistic rendering and indexing of a book(s) in a web page.

FIG. 1 is an example system 100 for the realistic rendering and indexing of a book(s) in a web page. Shown is a user 101 who uses one or more of the devices 102 to generate a search request 108. The devices 102 include a cell phone 103, compute 104, network enabled television 105, or smart phone 106. One or more of these devices 102 may be a host device. Using a book search GUI 107 that is generated by one or more of the devices 102, the user 101 generates the search request 108 and this search request 108 is transmitted across the network 109 by one of the devices 102. The search request 108 may include a string value that is to be used to identify a book(s). Operatively connected to the network 109 is a web server 110 to serve up web pages that include book search results. To generate the book search results 114, a query (e.g., a Structured Language Query (SQL)) may be set to a database server 111. The database server 111 may retrieve book data from a database 112, and book summary data from a data base 113. Using the data retrieved from the book data database 112, and the book summary data database 113, this data is returned to the database server 111. Included within the book dimension data database 112 is data used to capture the depth dimension of the book to be used or rendering purposes. Included in the book summary data database 113 are summaries of each book, the summary written for the user 101. In some example embodiments, the data is sorted lexigraphically by the database server 111. The database server 111 provides the data to the web server 110, where this data is formatted and inserted into a web page that is provided to one of the devices 102 for display or rendering within the book search GUI 107. This web page is referenced herein as a book search results 114.

Figure 2:
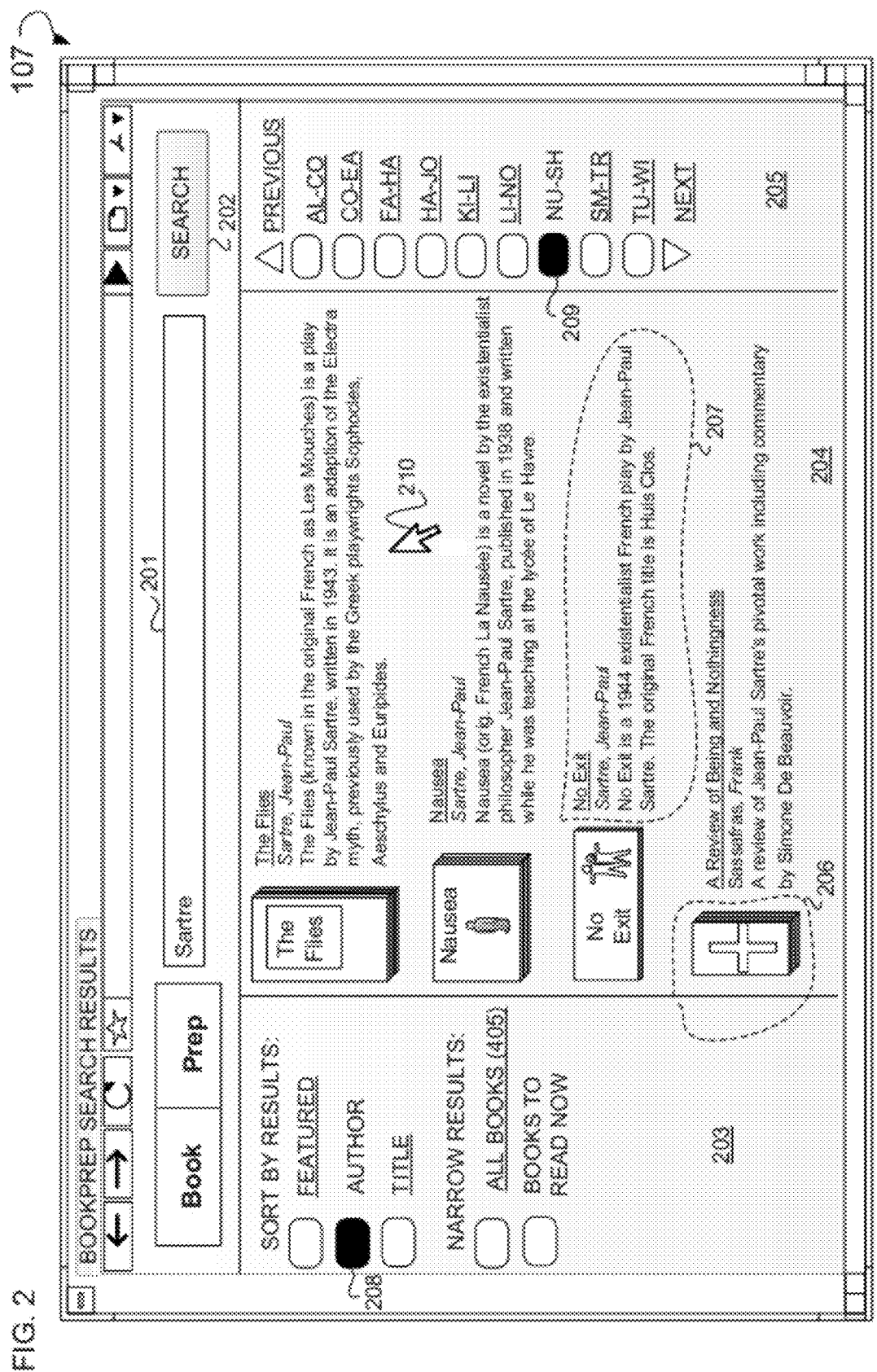
FIG. 2 is a diagram of a book search Graphical User Interface (GUI), according to an example embodiment, used to realistically render and index book(s) in a web page.

FIG. 2 is a diagram of an example book search GUI 107 used to realistically render and index book(s) in a web page. Shown is a text box 201 into which are entered search terms denoting terms in a book for which a search is to be conducted. Here the string "Sartre" is provided. Also shown is a screen object 202 that is used to receive input via a graphical pointer 210. The graphical pointer 210 may be manipulated via an input device such as a mouse, touch pad, touch screen, microphone, light pen, keyboard, or other suitable input device. In some example embodiments, the user 101 interacts with the book search GUI 107 through a means that expresses the intent of the user 101, where this means includes a touch gesture, motion tracking, or voice recognition. The screen objects referenced herein receive input from the input device via the graphical pointer 210. This screen object 202 may be a button, radio button, check box, or other suitable screen object. Also shown are fields 203, 204, and 205 that make up portions of the webpage rendered in the book search GUI 107. Included in the field 203 (i.e., a sort pane) is a screen object 208 that is used to sort the result set that is generated using the string. Here the screen object 208 is a check box that is selected to identify "authors" associated with the result set. The subset is displayed in field 204 (i.e., an icon and summary pane) and includes an icon 206 and a summary 207. The icon 206 is generated using the book data from the book data database 112. The summary 207 is generated from data retrieved from the book summary data database 113. Also shown is screen object 209 that is rendered within the field 205 (i.e., a subset selection pane). This screen object 209 is part of a series of screen objects used to select and display a portion of the lexigraphically sorted subset of the result set. Here, search results from the result set are displayed that lexigraphically fall between strings starting with "NU," and strings starting with "SH."

Figure 3:
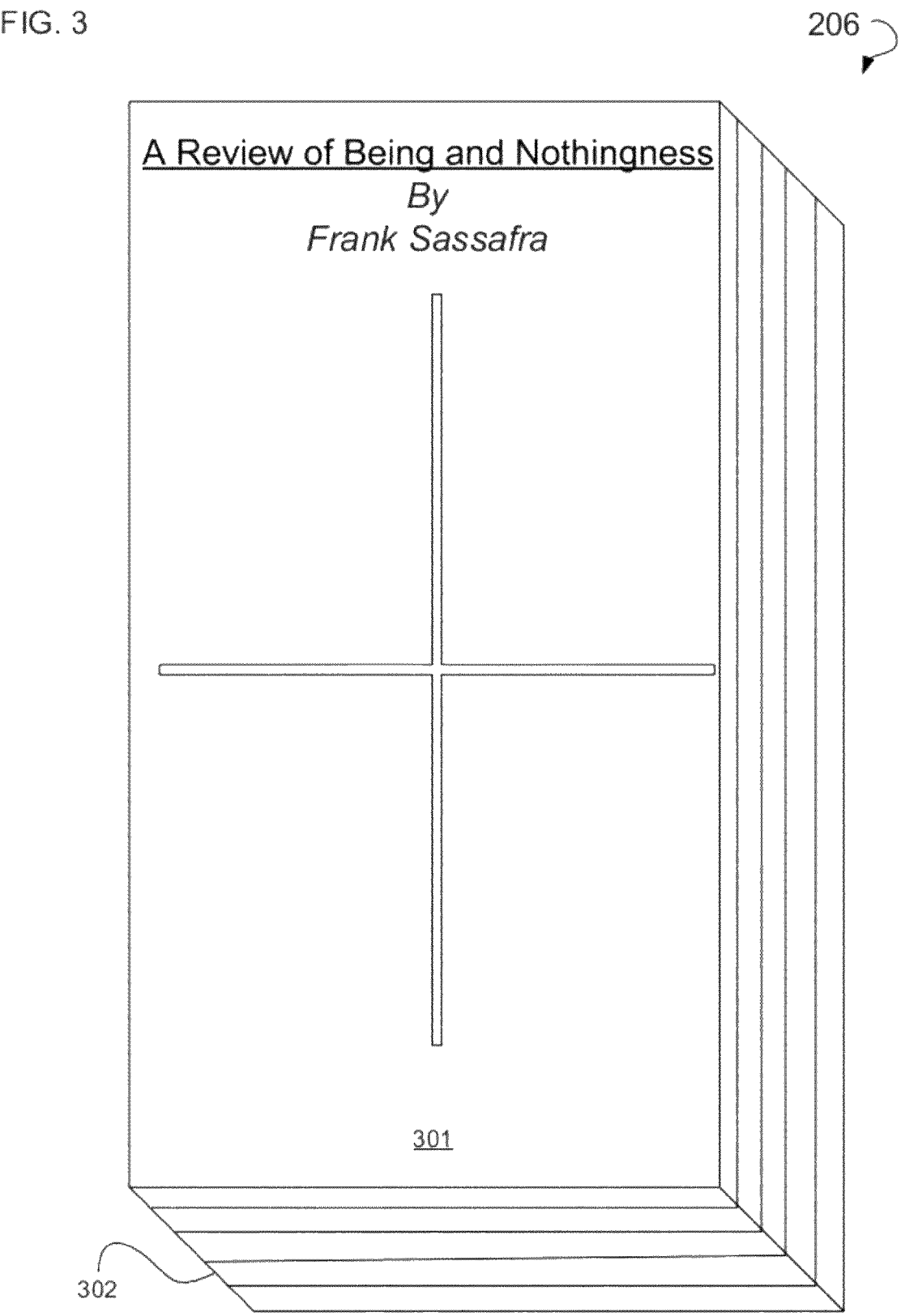
FIG. 3 is an exploded view of an example icon.

FIG. 3 is an exploded view of the example icon 206. Shown is the front 301 of the icon 206 illustrating the height and width dimensions. This front 301 corresponds to the cover of a book, and the trim size associated therewith. Also shown is a side 302 of the icon 206 illustrating the depth dimension. The side 302 corresponds to the side of the book as defined by data relating to the physical characteristics of the book. The method to calculate this side 302 is illustrated below.

Figure 4:
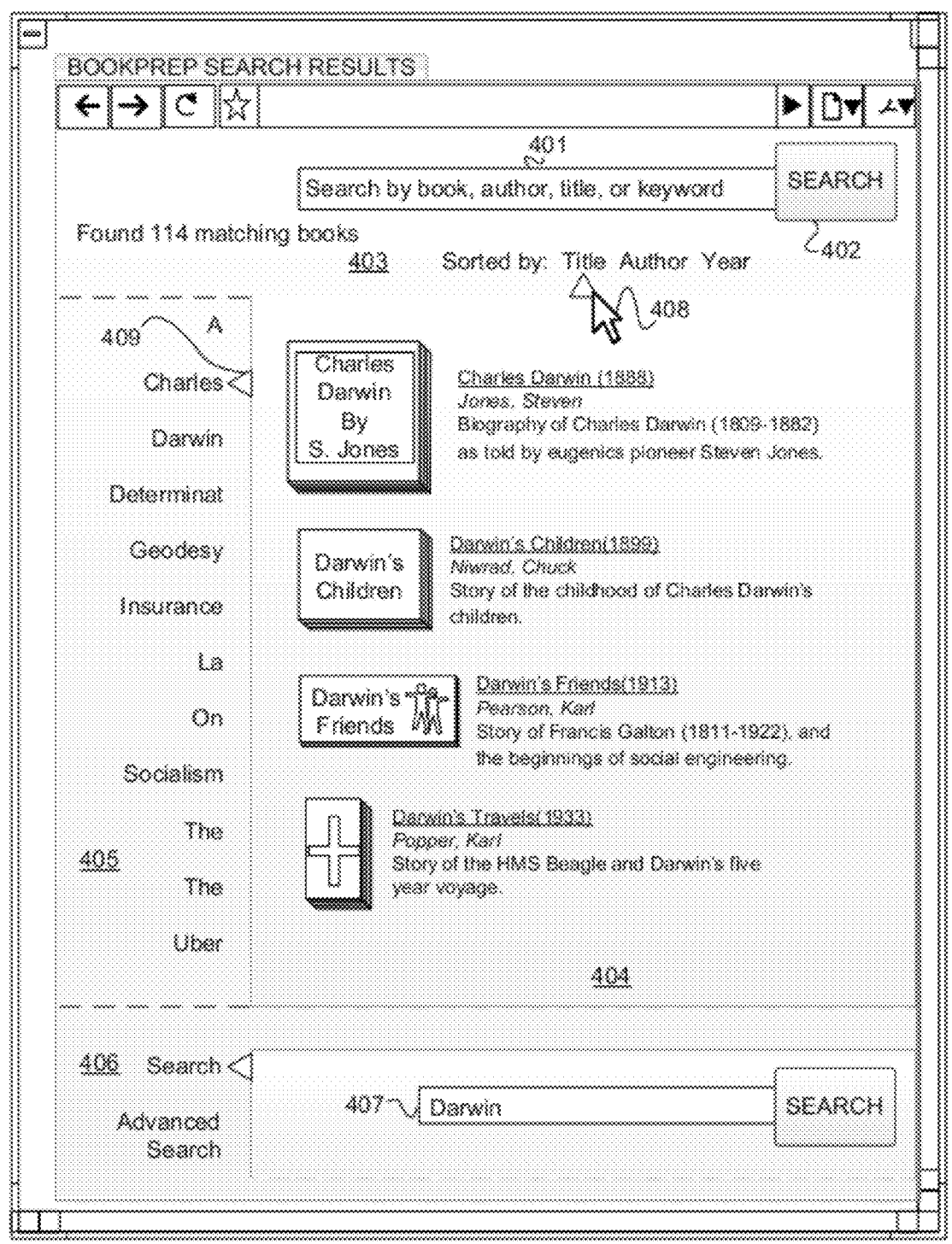
FIG. 4 is a diagram of a book search GUI, according to an example embodiment, used to realistically render and index book(s) in a web page that are sorted by title.

FIG. 4 is a diagram of an example book search GUI 107 used to realistically render and index book(s) in a web page that are sorted by title. Shown is the book search GUI 107 that is divided into portions of the webpage rendered in the book search GUI 107. Illustrated is the field 403 that acts as a sort pane. Included in the field 403 is a screen object that may be selected through the use of the graphical pointer 408 to sort the result set that is generated using the search string. Also included in the field 403 is a text box 401 into which is entered a search string denoting terms in a book for which a search is to be conducted. These terms may be associated with a book (i.e., text generally appearing in a book), author of a book, title of a book, or keywords (i.e., stored metadata related to the book). Also shown is a screen object 402 that is used to receive input via a graphical pointer 408. A field 404 is shown that acts as an icon and summary pane. Further, a field 405 is illustrated that includes the subset selection pane. Included within the field 405 is a screen object 409 that denotes part of a series of screen objects used to select and display a portion of the lexigraphically sorted subset of the result set. Each search object in the field 405 may correspond to a distinct webpage. Further, a field 406 is illustrated that includes a text box 407 into which is entered a search string. Here the string "Darwin" is provided. This search string may be entered using the graphical pointer 408.

Figure 5:
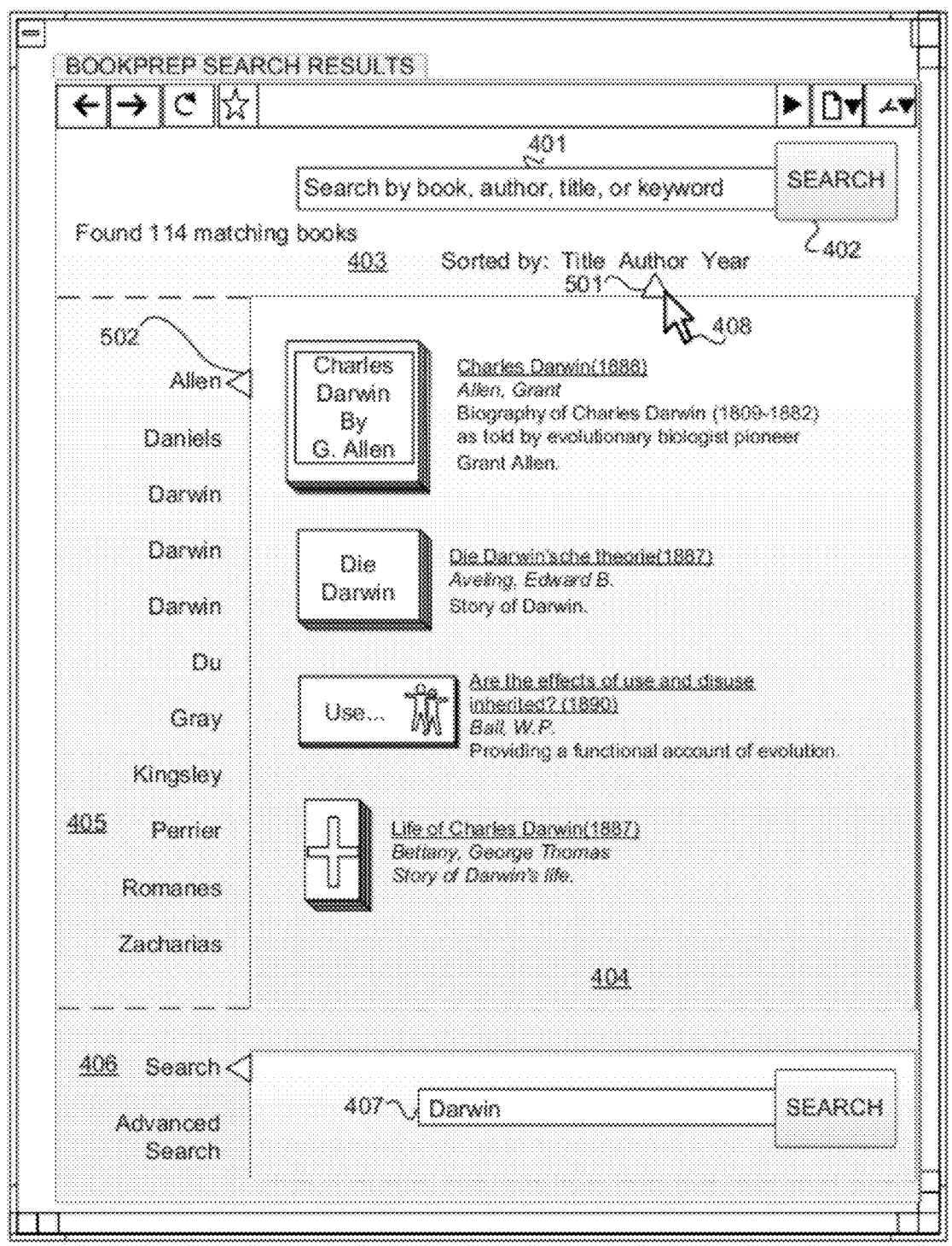
FIG. 5 is a diagram of a book search GUI, according to an example embodiment, used to realistically render and index book(s) in a web page that are sorted by author.

FIG. 5 is a diagram of an example book search GUI 107 used to realistically render and index book(s) in a web page that are sorted by author. Shown is the field 403 where a search object 501 has been selected using the graphical pointer 408. Where this search object 501 is selected, the result set displayed in the field 404 are sorted by author, as opposed to title. (See FIG. 4.) Screen object 502 is displayed in the field 405 to reflect the result set sorted by author, where the author of the first book in the result set has the last name of "Allen." Allen is the first entry in the field 404 (i.e., the icon and summary pane) for the first webpage. Daniels is the first entry in the field 404 for the second webpage that appears as part of the result set.

Figure 6:
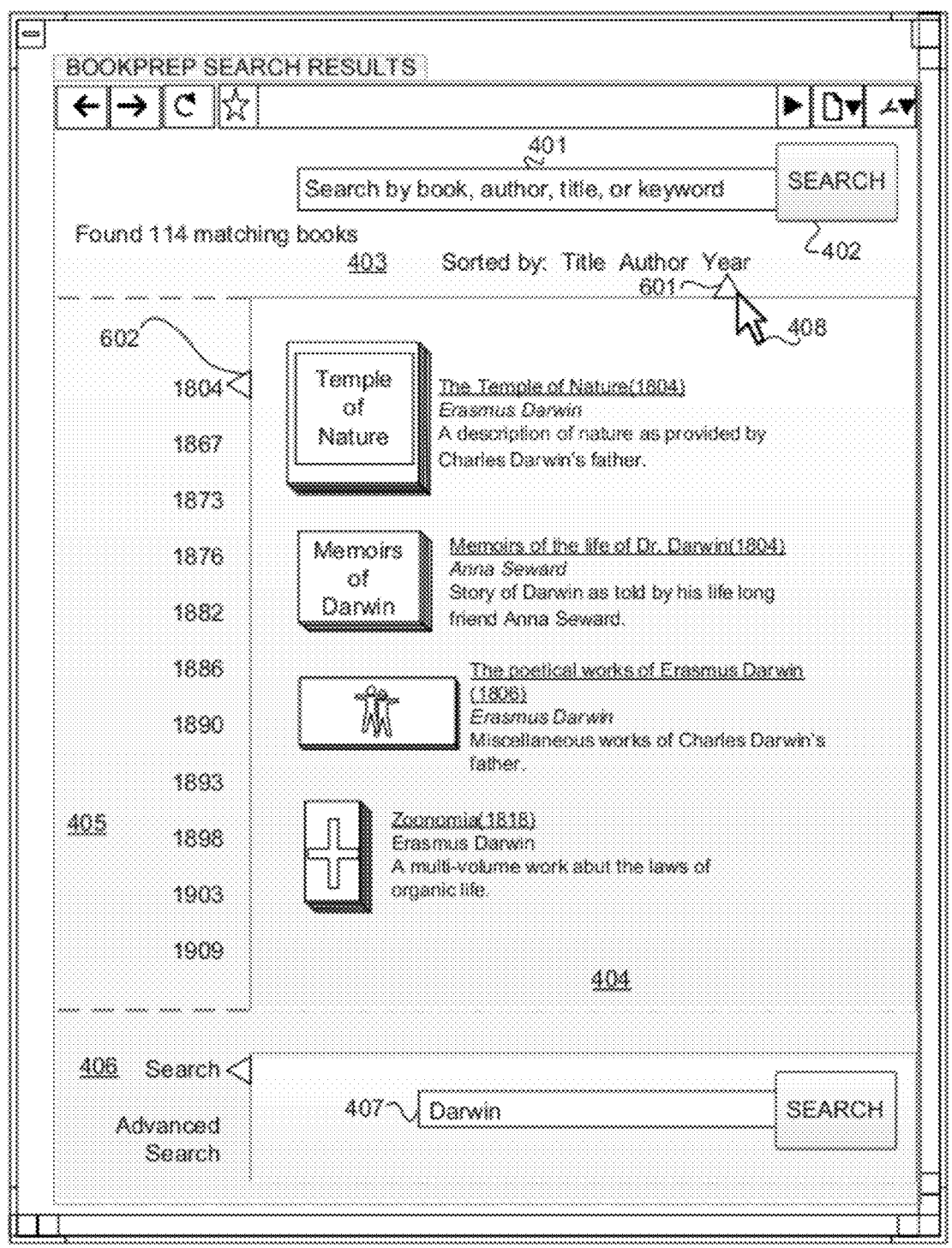
FIG. 6 is a diagram of a book search GUI, according to an example embodiment, used to realistically render and index book(s) in a web page that are sorted by year.

FIG. 6 is a diagram of an example book search GUI 107 used to realistically render and index book(s) in a web page that are sorted by year. Shown is a screen object 601 that is selected using the graphical pointer 408 to sort a result set by year. This screen object 601 appears as part of the field 403. Also shown is a screen object 602 that denotes the year(s) of publication for a result set sorted year. Here, the first entry in a webpage having the result set sorted by year is 1804. Each screen object subsequent to the screen object 602 denotes the first entry in a webpage that includes portions of the result set.

Figure 7:
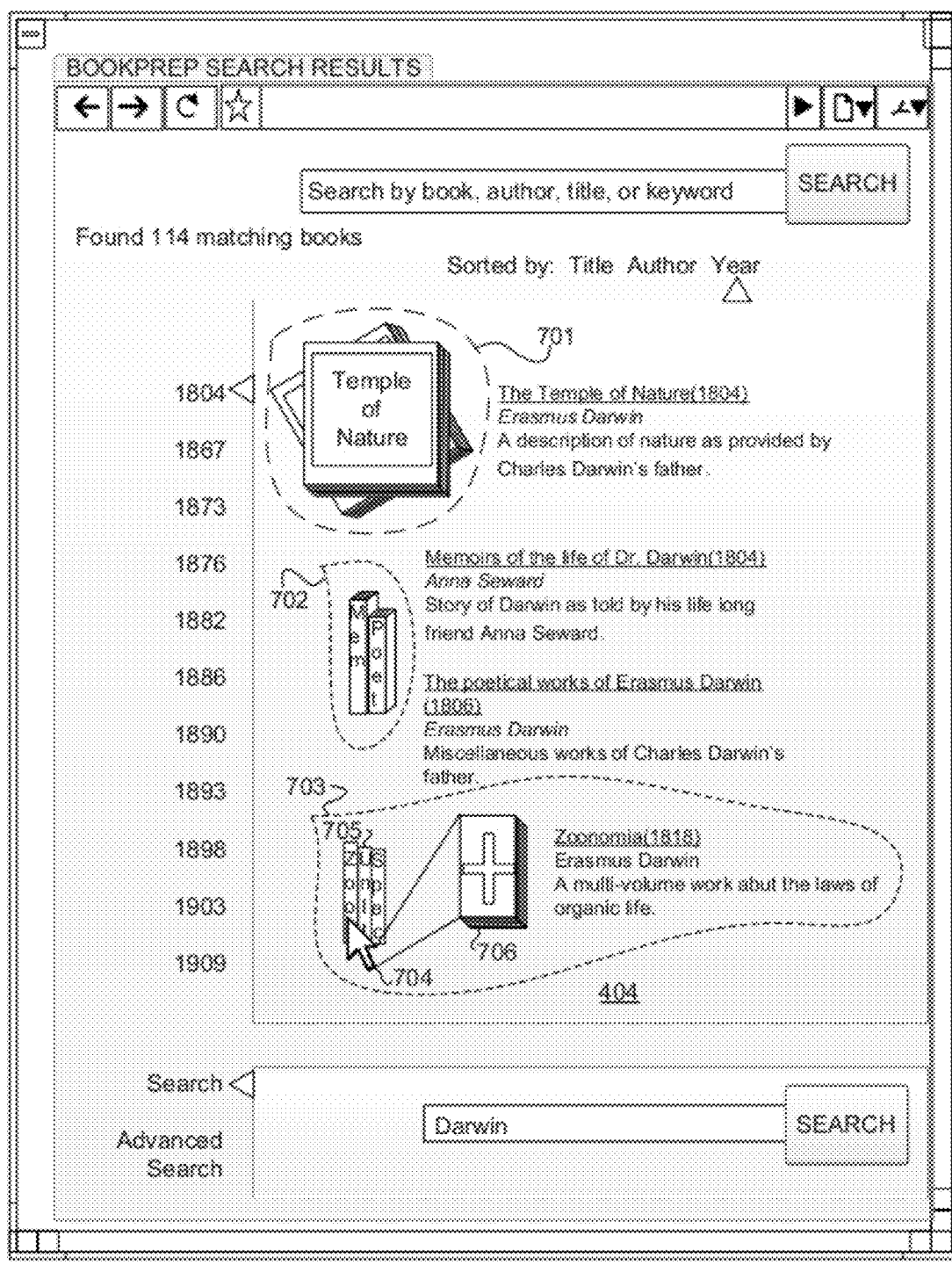
FIG. 7 is a diagram of a book search GUI, according to an example embodiment, used to realistically render and index book(s) in a webpage where each icon displays a plurality of books in a three-dimensional (3D) orientation.

FIG. 7 is a diagram of an example book search GUI 107 used to realistically render and index book(s) in a webpage where each icon displays a plurality of books in a 3D orientation. Each icon is illustrated as residing within the field 404. Shown is an icon 701 illustrating a plurality of books displayed in an offset manner. This offset may include the total number of books available for sale, the number of editions of the book available for sale, the number of languages of the book available for sale, the number of volumes available for sale, or some other representation of a plurality of books. Also shown is an icon 702 illustrating a spine view of a plurality of 3D books. This spine view may include the total number of books available for sale, the number of editions of the book available for sale, the number of language versions of the book available for sale, the number of volumes of the book available for sale, or some other representation of a plurality of books. As illustrated at 703, a plurality of two dimensional books may be shown at 705. Where one of the two dimensional books receives the focus of a graphical pointer 704, an exploded 3D view of a book is provided as illustrated at 706. This exploded view may be generated via a popup window, or through some other suitable method. The icons illustrated at 701-703 may be implemented separately or in combination to illustrate books that are part of a result set.

FIG. 8 is a diagram of an example book search GUI 107 used to realistically render and index book(s) in a webpage where icons are used to illustrate a search result history. A search history field 801 is shown that includes a search summary 802 and search history icon 803. The search history icon 803 illustrates the history of search in the form of an illustrated result set. This illustrated result set may take the form of a spine view of a plurality of 3D books that make up a result set. Each book in the result set may be accessed using the graphical pointer 804, and displayed in the field 404.

Figure 9:
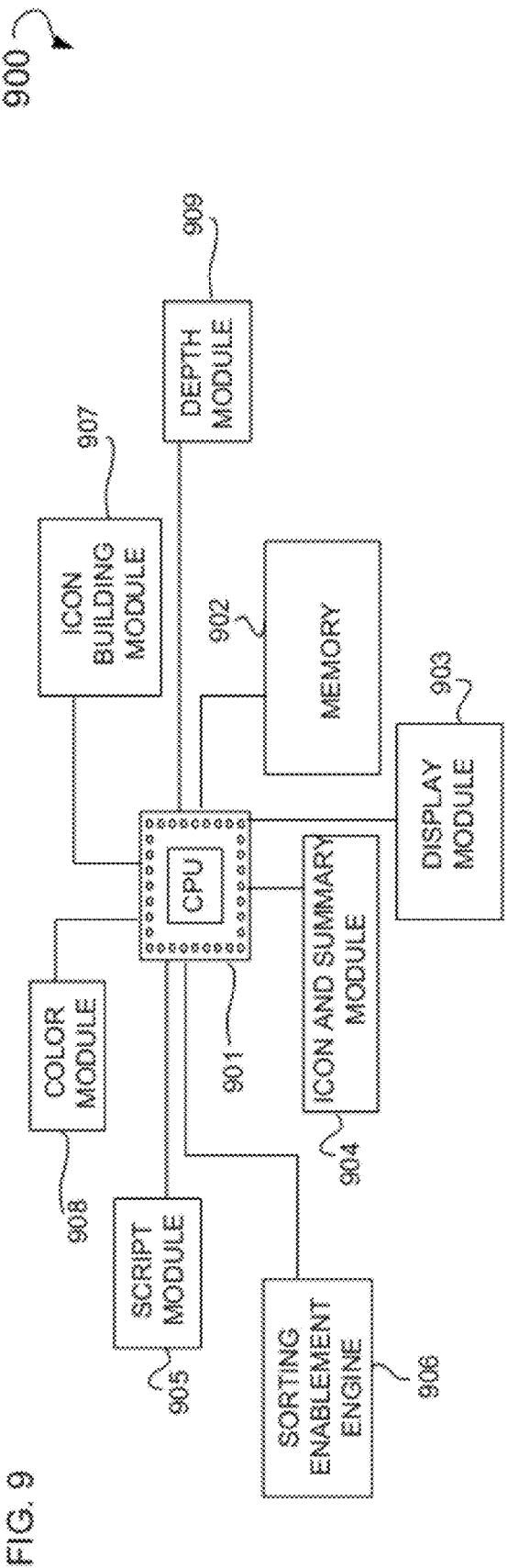
FIG. 9 is a block diagram of a system, according to an example embodiment, used to realistically render a book on a web page through providing depth to an icon representing the book(s).

FIG. 9 is a block diagram of a system 900 used to realistically render a book on a web page through providing depth to an icon representing the book(s). The blocks may be implemented in hardware, firmware, or software. These blocks may be operatively connected via a logical or physical connection. The web server 110 is an example of the system 900. Shown is a Central Processing Unit (CPU) 901 that is operatively connected to a memory 902. Operatively connected to the CPU 901 is a display module 903 to preparing for display within a GUI, a subset selection pane, an icon and summary pane, and a sort pane. Operatively connected to the CPU 901 is a icon and summary module 904 to preparing for display, within the icon and summary pane, a result set that includes an icon representing a three dimensional book and a textual summary of the book. Operatively connected to the CPU 901 is a script module 905 to enable a screen object, within the subset selection pane, to receive input to select a subset of the result set to be displayed within the icon and summary pane. Operatively connected to the CPU 901 is a sorting enablement engine 906 to enable a screen object, within the sort pane, to receive input to select the subset of the result set to be sorted and displayed within the icon and summary pane. Operatively connected to the CPU 901 is an icon building module 907 to build an icon through setting a photographic image, representing a cover of the book, based upon a trim value, the trim value denoting the height and width of the icon as displayed in the icon and summary pane. Additionally, the icon building module is executed to set a depth dimension of the icon, representing the number of pages of the book, as displayed in the icon and summary pane. Operatively connected to the CPU 901 is a color module 908 to set a color of the depth dimension of the icon based upon the color of the pages of the book. Operatively connected to the CPU 901 is a depth module 909 to set the depth dimension of the icon based upon a weight of paper used in the number of pages of the book. Operatively connected to the CPU 901 is a sorting module 910 to lexigraphically sorting the result set, or a subset of the result set. In some example embodiments, the preparing for display includes generating a web page to be rendered within the GUI, the web page, when rendered, to include the selection pane, the icon and summary pane, and the sort pane.

Figure 10:
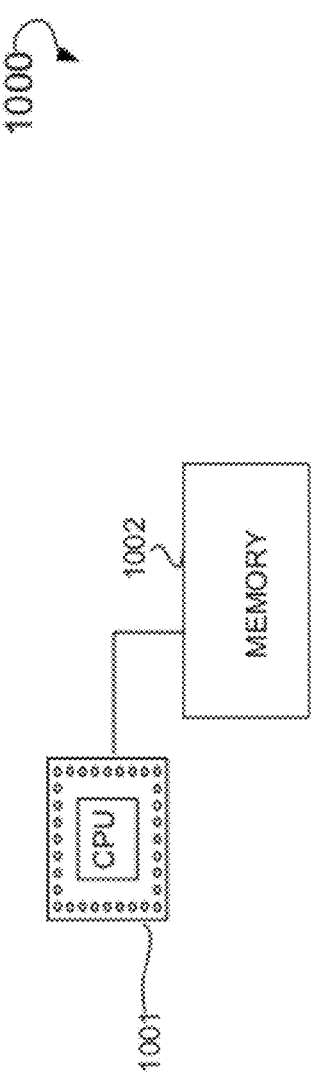
FIG. 10 is a diagram of a computer system, according to an example embodiment, that includes logic encoded as instructions on a computer readable media that when executed by a processor associated with the computer system realistically renders a book on a web page through providing depth to an icon representing the book(s).

FIG. 10 is a diagram of a computer system 1000 that includes logic encoded as instructions on a computer readable media that when executed by a processor associated with the computer system 1000 realistically renders a book on a web page through providing depth to an icon representing the book(s). Shown is a CPU 1001 operatively connected to computer readable media (or medium) 1002. The instructions when executed may generate for display, within a GUI, a web page that includes a subset selection pane, an icon and summary pane, and a sort pane. Further, the instructions when executed may generate for display, within the icon and summary pane, the web page to further include a result set that includes an icon representing a three dimensional book and a textual summary of the book. Additionally, the instructions when executed may enable a screen object, within the subset selection pane, to receive input to select a subset of the result set to be displayed within the icon and summary pane. Further, the instructions, when executed, may enable a screen object, within the sort pane, to receive input to select the subset of the result set to be sorted and displayed within the icon and summary pane. Additionally, the instructions, when executed, may set a photographic image, representing a cover of the book, based upon a trim value, the trim value denoting the height and width of the icon as displayed in the icon and summary pane. The instructions, when executed, may set a depth dimension of the icon, representing the number of pages of the book, as displayed in the icon and summary pane. The instructions may also be executed to set a color of the depth dimension of the icon based upon the color of the pages of the book. The instructions may further be executed to set the depth dimension of the icon based upon a weight of paper used in the number of pages of the book. Additionally, the instructions may be executed to lexigraphically sort the result set, or the subset of the result set.

Figure 11:
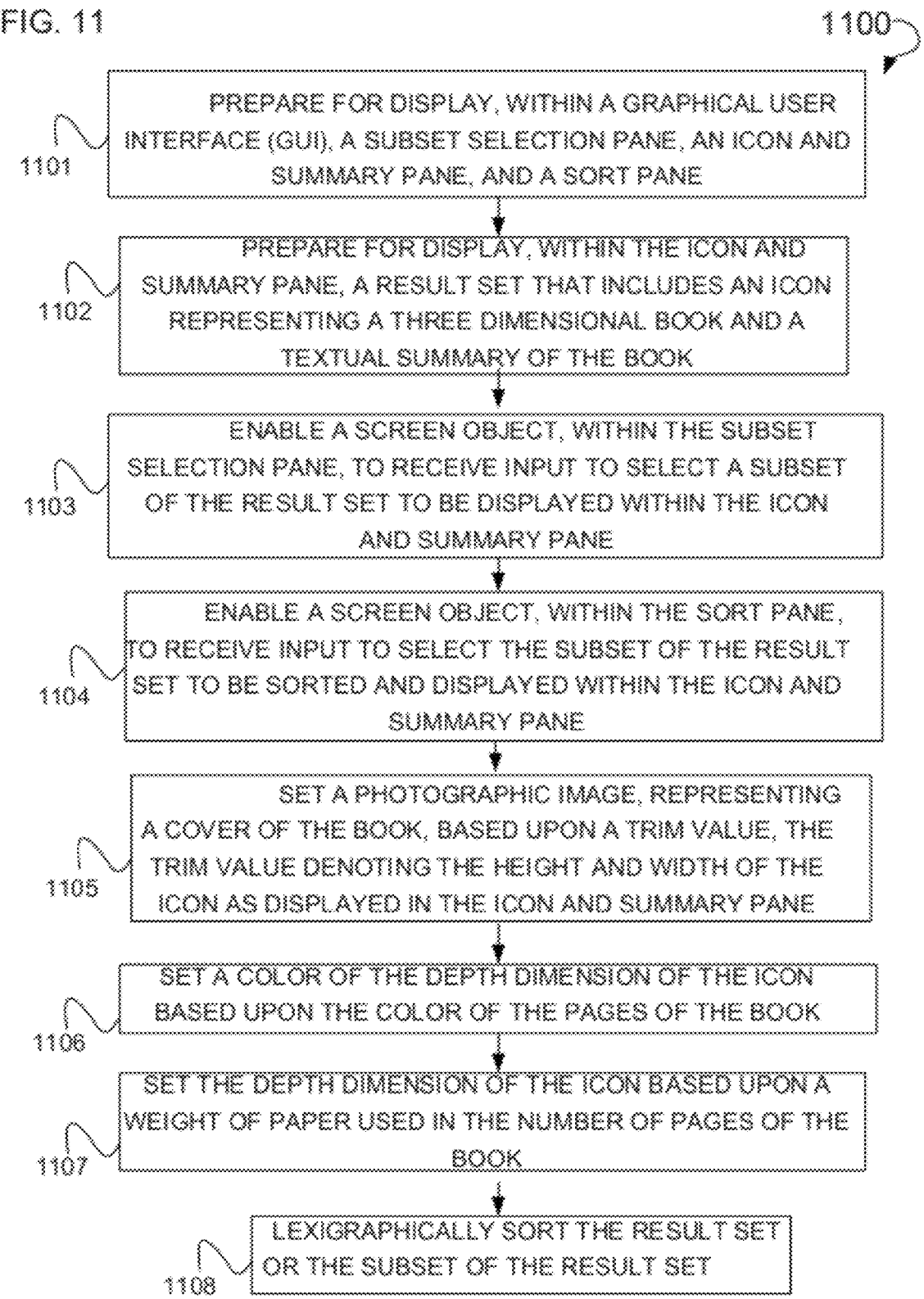
FIG. 11 is a flow chart illustrating a method, according to an example embodiment, executed to realistically renders a book on a web page through providing depth to an icon representing the book(s).

FIG. 11 is a flow chart illustrating an example method 1100 executed to realistically renders a book on a web page through providing depth to an icon representing the book(s). This method 1100 may be executed by the data base server 111 or web server 110. Operation 1101 is executed by the display module 903 to prepare for display, within a GUI, a subset selection pane, an icon and summary pane, and a sort pane. Operation 1102 is executed by the icon and summary module 904 to display, within the icon and summary pane, a result set that includes an icon representing a three dimensional book and a textual summary of the book. Operation 1103 is executed by the script module 905 to enable a screen object, within the subset selection pane, to receive input to select a subset of the result set to be displayed within the icon and summary pane. Operation 1104 is executed by the sorting enablement engine 906 to enable a screen object, within the sort pane, to receive input to select the subset of the result set to be sorted and displayed within the icon and summary pane. Operation 1105 is executed by the icon building engine 907 to building the icon through setting a photographic image, representing a cover of the book, based upon a trim value, the trim value denoting the height and width of the icon as displayed in the icon and summary pane. Additionally, the operation 1105 is executed by the icon and building engine 907 to set a depth dimension of the icon, representing the number of pages of the book, as displayed in the icon and summary pane. Operation 1106 is executed by the color module 908 to set a color of the depth dimension of the icon based upon the color of the pages of the book. Operation 1107 is executed by the depth module 909 to set the depth dimension of the icon based upon a weight of paper used in the number of pages of the book. Operation 1108 is executed by the sorting module 910 to lexigraphically sorting the result set, or a subset of the result set. In some example embodiments, preparing for display includes generating a web page to be rendered within the GUI, the web page, when rendered, to include the selection pane, the icon and summary pane, and the sort pane.

Figure 12:
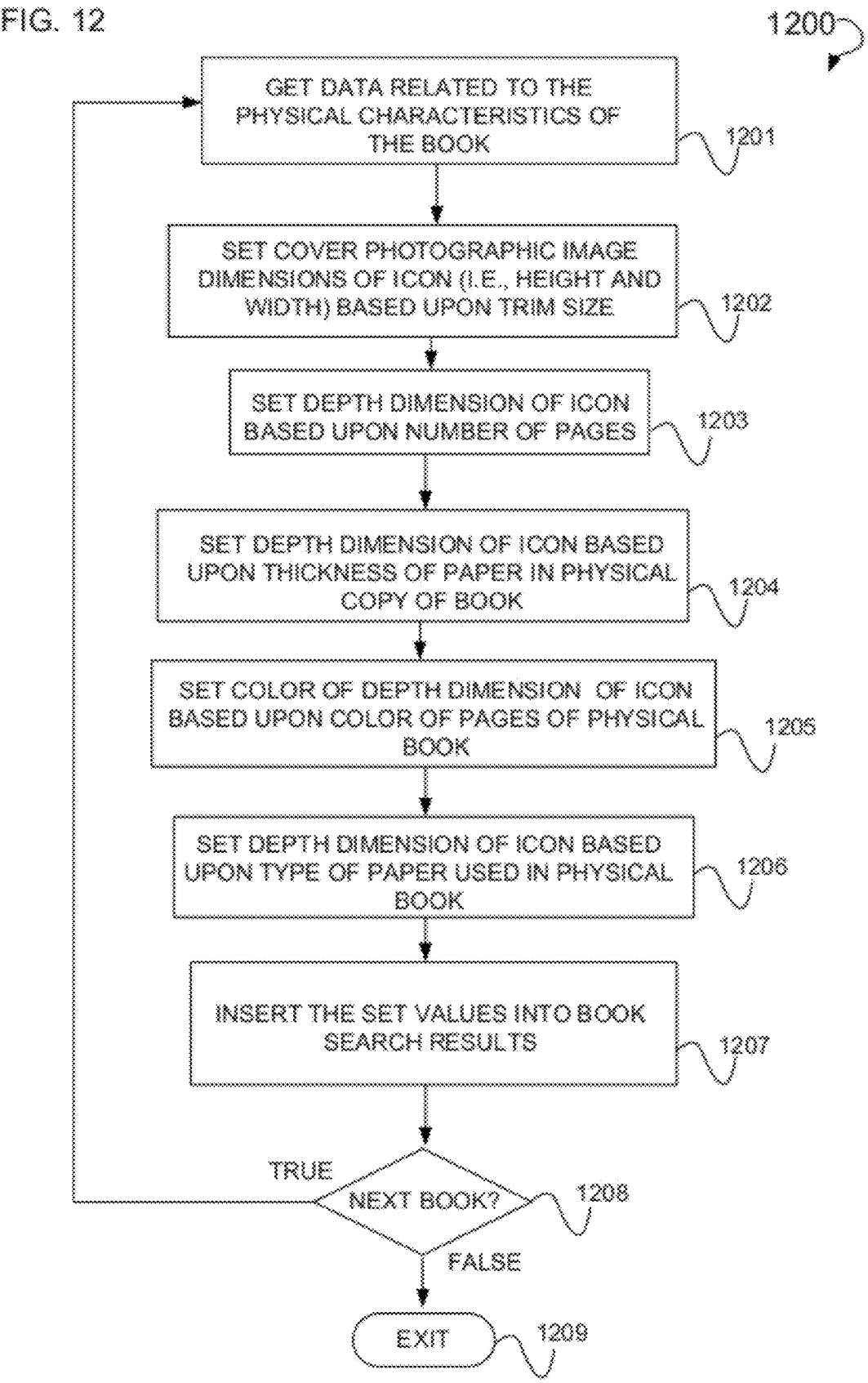
FIG. 12 is a flow chart illustrating a method executed, according to an example embodiment, to realistically render a book on a web page through providing depth to an icon representing the book(s).

FIG. 12 is a flow chart illustrating an example method 1200 to realistically render a book on a web page through providing depth to an icon representing the book(s). This method 1200 may be executed by the database server 111. In some example embodiments, some portion of the operations shown as part of method 1200 may be executed by a client devices such as the devices 102. Shown is an operation 1201 that is executed to get data related to the physical characteristics of the book. This data may be the number of pages in the book, weight of paper associated with the book, type of paper associated with the book, color of the paper associated with the book, trim size of the book (i.e., the dimensions of the pages of the book), and/or a photographic image of the cover of the book. Specifically, the number of pages may be an integer value representing the number of pages of the book. The weight of paper may be understood as a float value representing the grams per square meter of paper ($g/m^2$). This weight of paper generally corresponds to the thickness of the paper such that the higher the weight, the thicker the paper. The type of paper may be understood as a character value representing the coarseness of the paper grain. The color of the paper may be understood as a hexadecimal value representing the color of the paper as rendered in a web page. The trim size may be understood as float values representing the height of the width of the pages of the book. The photographic image may be understood as a Binary Large Object (BLOB) representing the cover of the book.

Operation 1202 is executed to set the cover photographic image dimensions of the icon based upon trim size. Specifically, through executing operation 1202 the photographic image of the book cover may be adjusted to match the relative trim size of the book. Relative trim size, as used herein, means the trim size of the book relative to other icons representing other books to be rendered in a web page. For example, if the trim size of a first book is 4 cm×3 cm, and the trim size of a second book is 5 cm×4 cm, the photographic image of the first book will be adjusted to appear smaller than the photographic image of the second book in the rendered web page. In some cases pixel values are mapped to each square centimeter that makes up the trim size of a book, and this mapping is used in determining the relative trim size values. Specifically, the pixel values and the trim size are proportional such that they vary in such a way that one is a constant multiple of the other, or equivalently they have a constant ratio. In some example embodiments, this ratio is maintained using a linear function that maps, each square centimeter that makes up the trim size of a book, to pixel values representing the book. Further, in some example embodiments, a logarithmic function is used in this mapping such that a maximum pixel area is determined.

Operation 1203 is executed to set the depth dimension of the icon based upon the number of pages for the book. The pages associated with a book are displayed as part of the icon. The depth attributed to the icon using the pages is based, in part, upon the number of pages associated with the book. In one example embodiment, each page has a predefined value associated with it for the purpose of expressing depth using the icon. The predefined value is applied to all icons for all books that are rendered via icons in a web page. For example, it may be predetermined that a page takes up an area of 20 square pixels such that the depth of the icon representing a 100 page book takes up an area of 2000 square pixels.

Operation 1204 is executed to set a depth dimension of the icon based upon the thickness of paper in the physical copy of the book. The depth attributed to the icon via the number of pages may be modified by the thickness of the paper used in each page of the book. For example, a baseline weight or thickness of the paper may be set, this base line represented in terms of pixel values (e.g., 2 pixel values). A pixel value may be mapped to the weight of the paper. This base line may be modified such that if the weight of the paper is higher that the baseline (e.g., 3 pixels values as opposed to 2 pixel values), then the pixel area of each page used to provide depth to the icon is increased. Further, if the pixel value of the weight is less than a baseline weight, then the pixel area of each page used to provide the depth to the icon is decreased.

Operation 1205 is executed to set the color of the depth dimension of the icon based upon the color of the pages of the physical book. Using a hexadecimal value (i.e., web colors) the depth of the icon can be colored to reflect to the color of the physical pages of the book. For example, #FFFFFF represents the color white. In some example embodiments, shadowing is used to generate the effect of depth rather than a color of the physical pages of the book.

Operation 1206 is executed to set the depth dimension of the icon based upon the type of paper used in the physical book. As stated above, type of paper may be understood as a character value representing the coarseness of the paper grain. For example, a character value of "a," "b," "c," and "d" may be used to represent a spectrum of more or less coarse paper that may be represented via more or less shading associated with the pixel area being used to represent the depth of the icon.

Operation 1207 is executed to insert the set values from operations 1202-1206 into the web page. In some example cases, only operations 1201-1203 are executed prior to the execution of the operation 1207. In some example embodiments, operation 1207 is executed to generate HTML or XML code that includes the set values, and the necessary scripting language for rendering these set values in a web page. This HTML or XML code may be executed using the book search GUI 107.

Decision operation 1208 is executed to determine whether a next book exists in a search result for which data need to be gotten and set. In cases where decision operation 1208 evaluates to "true," operation 1201 is re-executed. In cases where decision operation 1208 evaluates to "false," a termination operation 1209 is executed.

Figure 13:
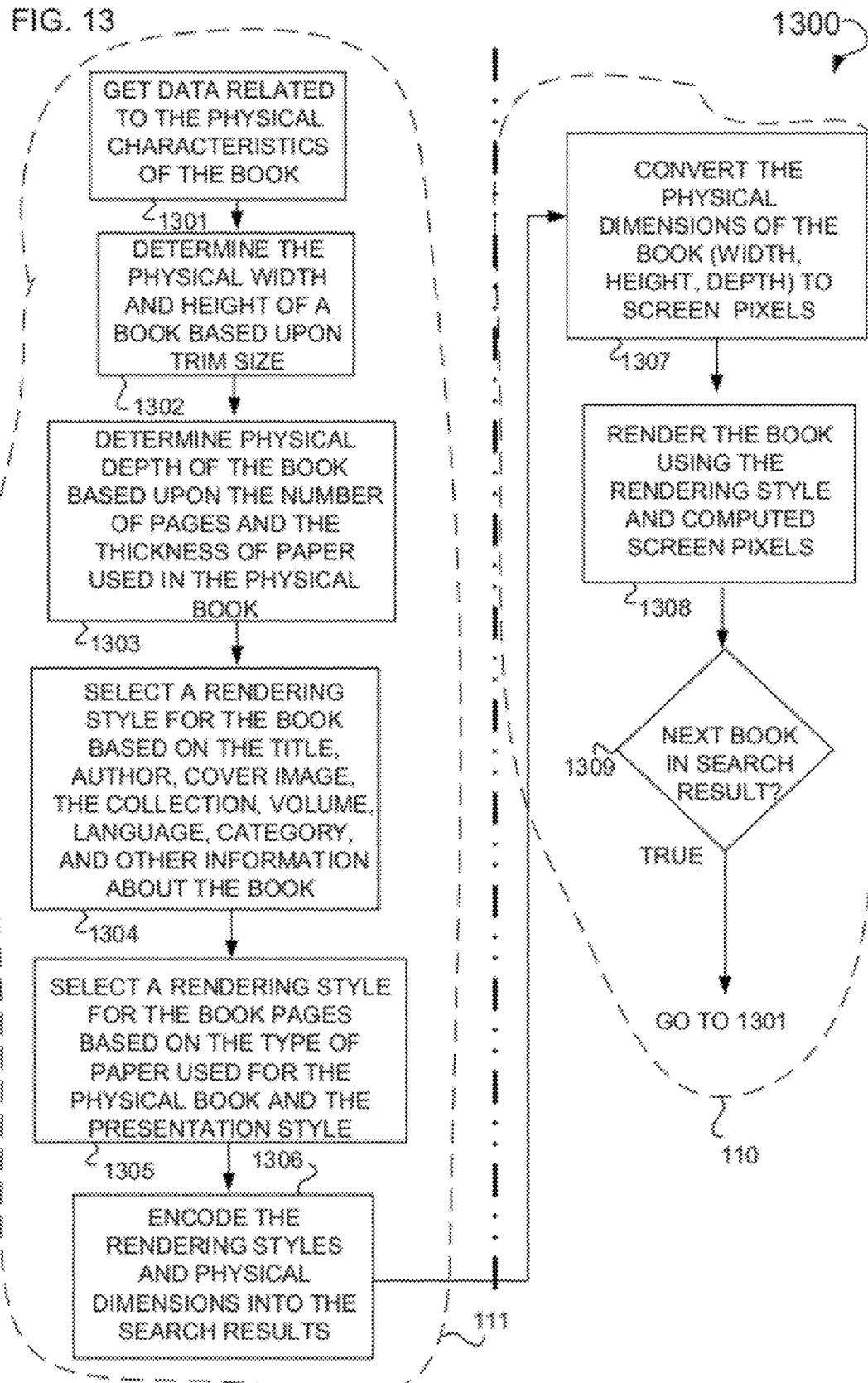
FIG. 13 is a dual-stream flow chart illustrating a method, according to an example embodiment, to realistically render a book on a web page through providing depth to an icon representing the book(s).

FIG. 13 is a dual-stream flow chart illustrating an example method 1300 to realistically render a book on a web page through providing depth to an icon representing the book(s). Operations 1301-1306 may be executed by the database server 111. Operations 1307-1309 may be executed by the web server 110, or a host device such as one of the devices 102. Shown is an operation 1301 that is executed to get data related to the physical characteristics of the book. Operation 1302 is executed to determine the physical width and height of the book based upon the trim size. For example, a book may be 200 mm wide and 250 mm high. Operation 1303 is executed to determine the physical depth of the book based upon the number of pages and the thickness of paper used in the physical book. For example, if the book has 100 pages, and each page is 0.1 mm thick, then the depth is 10 mm. Operation 1304 is executed to select a rendering style for the book based on the title, author, cover image, the collection, volume, language, category, and other information about the book. For example, in one example embodiment, the cover image is simply used without modification. In another example embodiment, a cover is generated using the title and author, with colored stripes to indicate relevant categories, a number to show the volume, and a colored border to indicate the collection. Operation 1305 is executed to select a rendering style for the book pages based on the type of paper used for the physical book and the presentation style. For example, we might choose to show the edges of the pages directly, rendering a perspective view of the 3D book and with their color and texture chosen to match the original book pages. Or we might choose to render the book looking straight down on the front cover, so that the book depth is shown only by the shadow cast by the book. Operation 1306 is executed to encode the rendering styles and physical dimensions into the search results.

Operation 1307 is executed to convert the physical dimensions of the book (i.e., width, height, and depth) to screen pixels. In one example embodiment, this conversion is done with linear functions. For example, if the book is 200 mm×250 mm, we could use a constant ⅕ to render as 40 pixels×50 pixels. If the book has a depth of 10 mm, we could use a constant factor of ½ to render a shadow that extends 5 pixels wide. In other example embodiments, more sophisticated transformations may be employed (e.g., perspective, orthographic, or isometric). Further, in some example embodiments, non-linear functions are used so that unusually small books remain large enough to be visible, while unusually large books don't consume too much screen area. Operation 1308 is executed to render the book using the rendering style and computed screen pixels. Decision operation 1309 is executed to determine whether a next book exists in the search result (i.e., the result set). In cases where decision operation 1309 evaluates to "true," the operation 1301 is re-executed. In cases where decision operation 1309 evaluates to "false," a termination condition is executed.

Figure 14:
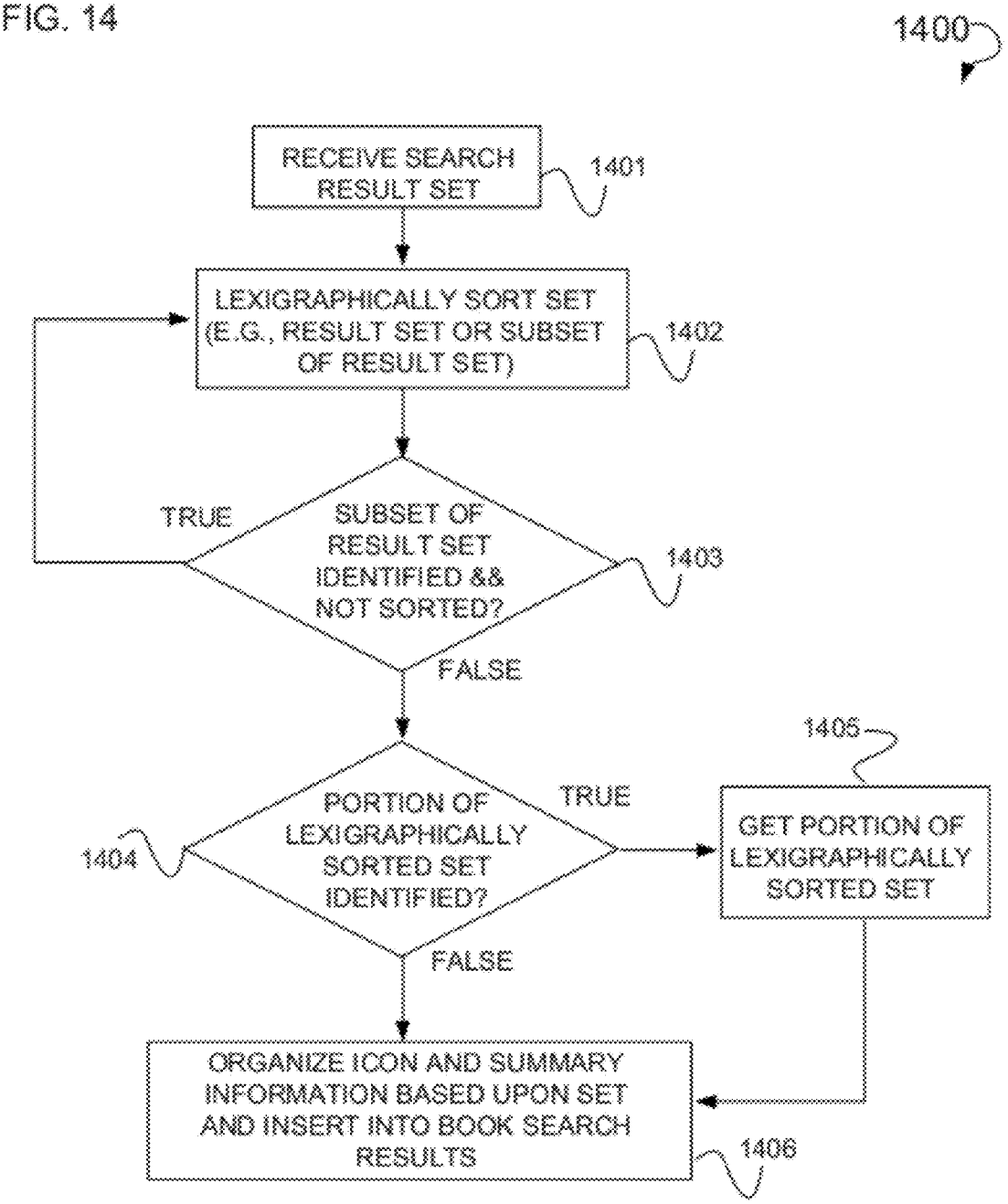
FIG. 14 is a flow chart illustrating a method, according to an example embodiment, that is executed to sort, index, and displayed book search results through re-indexing a sub-set of the search results using a predefined sort value.

FIG. 14 is a flow chart illustrating an example method 1400 that is executed to sort, indexed, and displayed book search results through re-indexing a sub-set of the search results using a predefined sort value. This method 1400 may be executed by the database server 111. Operation 1401 is executed to receive a search result set. This search result set may be received in response to a SQL query. Operation 1402 may be executed to lexigraphically sort the search result set. Decision operation 1403 may be executed to determine whether a subset of the result set has been identified and not sorted. Identification of the subset may be performed using one or more of the screen objects in the field 203. In some example embodiments, a flag value in memory is set for the result set where a sub set of the result set has be sorted. In cases where decision operation 1403 evaluates to "false," a further decision operation 1404 is executed. In cases where decision operation 1403 evaluates to "true," the operation 1402 is executed. Decision operation 1404 determines whether a portion of the lexigraphically sorted set has been identified. Identification may take the form of selecting a screen object from the field 205. In cases where decision operation 1404 evaluates to "true," operation 1405 is executed. In cases where decision operation 1404 evaluates to "false," operation 1406 is executed. Operation 1405 is executed to get a portion of the lexigraphically sorted subset. This portion as determined by the selected screen object from field 205. Operation 1406 is executed to organize icon and summary information and insert this icon and summary information into the search results as part of the book search results 114.

Figure 15:
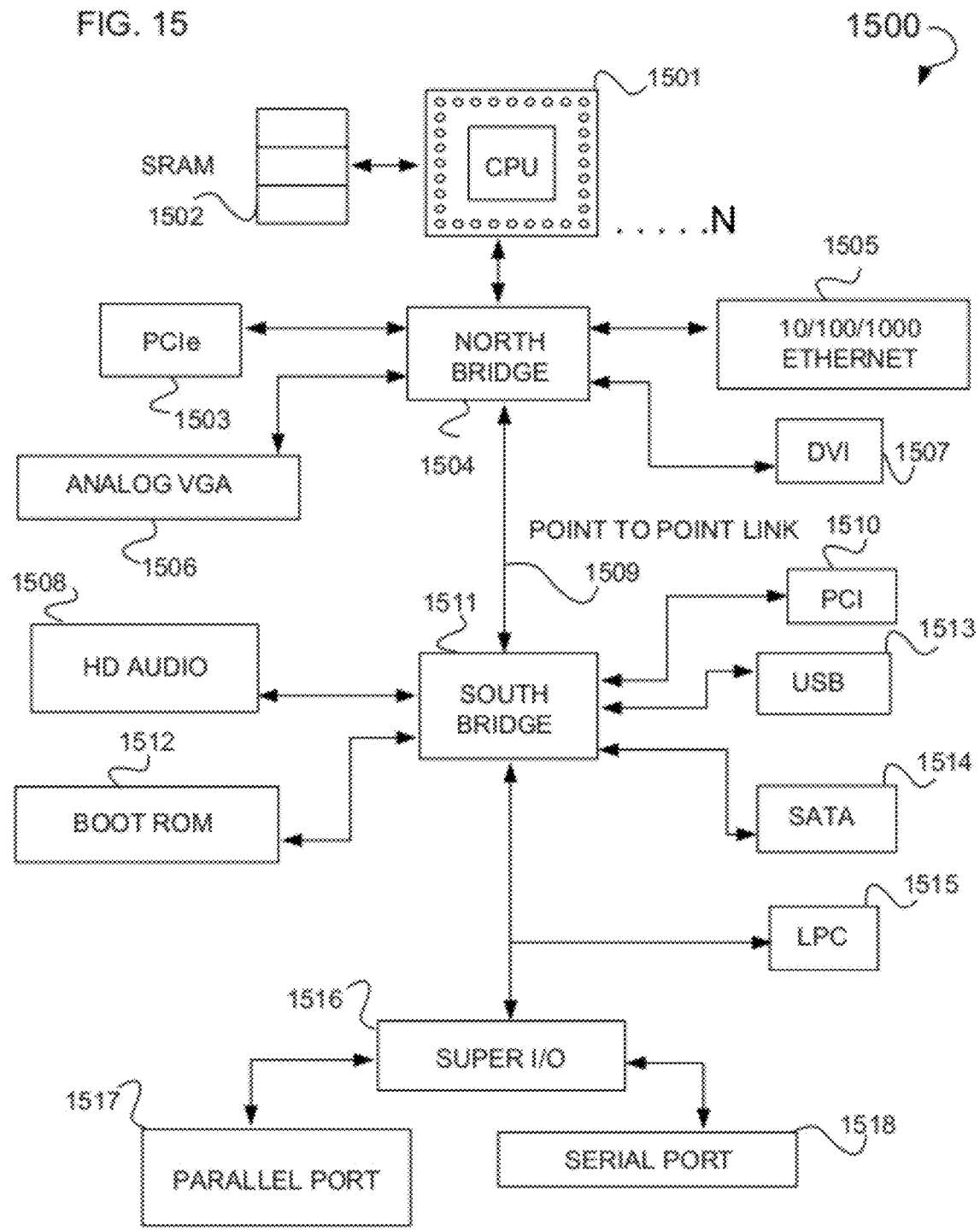
FIG. 15 is a diagram of an example computer system.

FIG. 15 is a diagram of an example computer system 1500. Shown is a CPU 1501. The processor die 201 may be a CPU 1501. In some example embodiments, a plurality of CPU may be implemented on the computer system 1500 in the form of a plurality of core (e.g., a multi-core computer system), or in some other suitable configuration. Some example CPUs include the x86 series CPU. Operatively connected to the CPU 1501 is Static Random Access Memory (SRAM) 1502. Operatively connected includes a physical or logical connection such as, for example, a point to point connection, an optical connection, a bus connection or some other suitable connection. A North Bridge 1504 is shown, also known as a Memory Controller Hub (MCH), or an Integrated Memory Controller (IMC), that handles communication between the CPU and PCIe, Dynamic Random Access Memory (DRAM), and the South Bridge. An ethernet port 1505 is shown that is operatively connected to the North Bridge 1504. A Digital Visual Interface (DVI) port 1507 is shown that is operatively connected to the North Bridge 1504. Additionally, an analog Video Graphics Array (VGA) port 1506 is shown that is operatively connected to the North Bridge 1504. Connecting the North Bridge 1504 and the South Bridge 1511 is a point to point link 1509. In some example embodiments, the point to point link 1509 is replaced with one of the above referenced physical or logical connections. A South Bridge 1511, also known as an I/O Controller Hub (ICH) or a Platform Controller Hub (PCH), is also illustrated. A PCIe port 1503 is shown that provides a computer expansion port for connection to graphics cards and associated GPUs. Operatively connected to the South Bridge 1511 are a High Definition (HD) audio port 1508, boot RAM port 1512, PCI port 1510, Universal Serial Bus (USB) port 1513, a port for a Serial Advanced Technology Attachment (SATA) 1514, and a port for a Low Pin Count (LPC) bus 1515. Operatively connected to the South Bridge 1511 is a Super Input/Output (I/O) controller 1516 to provide an interface for low-bandwidth devices (e.g., keyboard, mouse, serial ports, parallel ports, disk controllers). Operatively connected to the Super I/O controller 1516 is a parallel port 1517, and a serial port 1518.

The SATA port 1514 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 1502 and/or within the CPU 1501 during execution thereof by the computer system 1500. The instructions may further be transmitted or received over the 10/100/1000 ethernet port 1505, USB port 1513 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

In some example embodiments, the methods illustrated herein are stored in respective storage devices, which are implemented as one or more computer-readable or computer-usable storage media or mediums. The storage media include different forms of memory including semiconductor memory devices such as DRAM, or SRAM, Phase Change RAM (PCRAM), Memristor, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer implemented method for rendering book search results, the method being performed by one or more processors and comprising:
    generating a graphical user interface (GUI) to be displayed on a remote user device;
    receiving a search request for one or more books from the remote user device in response to a user interacting with the GUI; and
    in response to the search request, (i) determining a set of books that satisfy the search request, (ii) determining information about one or more physical characteristics of one or more books in the set of books, including a textual summary of the one or more books, and (iii) providing, on the GUI, one or more graphic features for respective one or more books in the set of books, wherein each graphic feature includes an image having the one or more physical characteristics of a particular book;
    wherein each graphic feature is provided by (i) selecting an image representing a cover of the respective book from the book data, and (ii) setting a depth dimension of the graphic feature based on the one or more physical characteristics of a particular book, the depth dimension representing a number of pages of the particular book.

2. The computer implemented method of claim 1, wherein each graphic feature is further provided by:
    setting a height dimension and a width dimension of the graphic feature based on the one or more physical characteristics of a particular book.

3. The computer implemented method of claim 1, wherein each graphic feature is provided by setting a color for the depth dimension of the graphic feature based on a color of the pages of the particular book, the color of the pages being one of the physical characteristics of the particular book.

4. The computer implemented method of claim 1, wherein each graphic feature is provided by setting the depth dimension of the graphic feature based on a weight of paper of the pages of the particular book, the weight of paper being one of the physical characteristics of the particular book.

5. The computer implemented method of claim 1, further comprising lexigraphically sorting the set of books that satisfy the search request.

6. The computer implemented method of claim 1, further comprising enabling a user to interact with the GUI to sort the set of books that satisfy the search request.

7. The computer implemented method of claim 1, wherein the GUI is generated as part of a web page to be rendered on a display of the remote user device.

8. A computer system comprising:
    a memory resource;
    at least one processor coupled to the memory resource, the at least one processor to:
    generate a graphical user interface (GUI) to be displayed on a remote user device;
    receive a search request for one or more books from the remote user device in response to a user interacting with the GUI; and
    in response to the search request, (i) determine a set of books that satisfy the search request, (ii) determine information about one or more physical characteristics of one or more books in the set of books, including a textual summary of the one or more books, and (iii) provide, on the GUI, one or more graphic features for respective one or more books in the set of books, wherein each graphic feature includes an image having the one or more physical characteristics of a particular book;
    wherein each graphic feature is provided by (i) selecting an image representing a cover of the respective book from the book data, and (ii) setting a depth dimension of the graphic feature based on the one or more physical characteristics of a particular book, the depth dimension representing a number of pages of the particular book.

9. The computer system of claim 8, wherein the at least one processor further provides each graphic feature by:
    setting a height dimension and a width dimension of the graphic feature based on the one or more physical characteristics of a particular book.

10. The computer system of claim 8, wherein the at least one processor provides each graphic feature by setting a color for the depth dimension of the graphic feature based on a color of the pages of the particular book, the color of the pages being one of the physical characteristics of the particular book.

11. The computer system of claim 8, wherein the at least one processor provides each graphic feature by setting the depth dimension of the graphic feature based on a weight of paper of pages of the particular book, the weight of paper being one of the physical characteristics of the particular book.

12. The computer system of claim 8, wherein the at least one processor further lexigraphically sorts the set of books that satisfy the search request.

13. The computer system of claim 8, wherein the at least one processor further enables a user to interact with the GUI to sort the set of books that satisfy the search request.

14. A non-transitory computer readable medium storing instructions that, when executed by one or more processors, cause the one or more processors to perform steps comprising:
    generating a graphical user interface (GUI) to be displayed on a remote user device;

receiving a search request for one or more books from the remote user device in response to a user interacting with the GUI; and in response to the search request, (i) determining a set of books that satisfy the search request, (ii) determining information about one or more physical characteristics of one or more books in the set of books, including a textual summary of the one or more books, and (iii) providing, on the GUI, one or more graphic features for respective one or more books in the set of books, wherein each graphic feature includes an image having the one or more physical characteristics of a particular book;

wherein each graphic feature is provided by (i) selecting an image representing a cover of the respective book from the book data, and (ii) setting a depth dimension of the graphic feature based on the one or more physical characteristics of a particular book, the depth dimension representing a number of pages of the particular book.

15. The non-transitory computer readable medium of claim 14, further storing instructions that cause the one or more processors to provide each graphic feature by:

setting a height dimension and a width dimension of the graphic feature based on the one or more physical characteristics of a particular book.

16. The non-transitory computer readable medium of claim 14, further storing instructions that cause the one or more processors to provide each graphic feature by setting a color for the depth dimension of the graphic feature based on a color of the pages of the particular book, the color of the pages being one of the physical characteristics of the particular book.

17. The non-transitory computer readable medium of claim 14, further storing instructions that cause the one or more processors to provide each graphic feature by setting the depth dimension of the graphic feature based on a weight of paper of the pages of the particular book, the weight of paper being one of the physical characteristics of the particular book.

18. The non-transitory computer readable medium of claim 14, further storing instructions that cause the one or more processors to lexigraphically sort the set of books that satisfy the search request.

19. The non-transitory computer readable medium of claim 14, further storing instructions that cause the one or more processors to enable a user to interact with the GUI to sort the set of books that satisfy the search request.

20. The non-transitory computer readable medium of claim 14, further storing instructions that cause the one or more processors to generate the GUI as part of a web page to be rendered on a display of the remote user device.

* * * * *